(No Model.) 6 Sheets—Sheet 1.
C. C. HILL.
MACHINE FOR MAKING SPUR WHEEL FENCING.
No. 373,458. Patented Nov. 22, 1887.
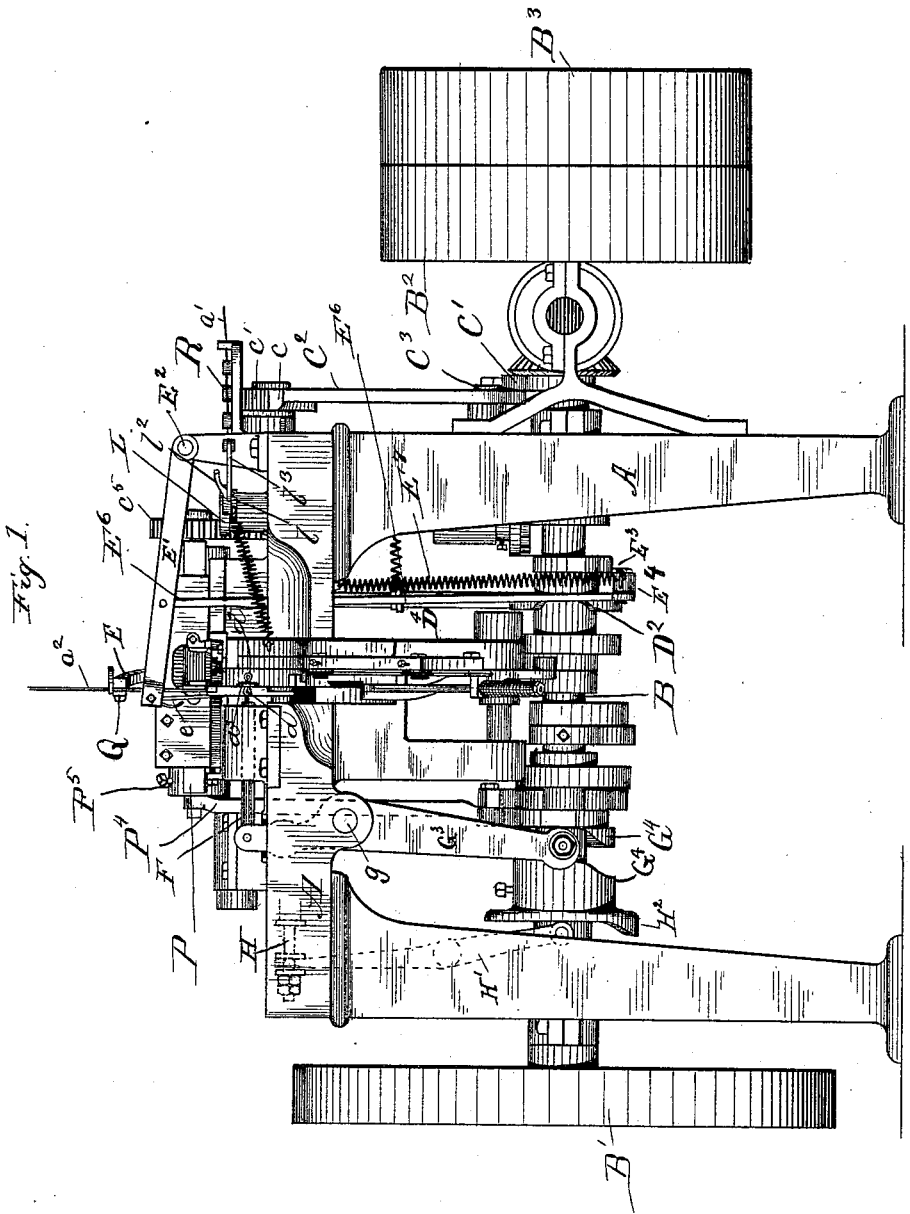
Witnesses:
Lew. E. Curtis.
H. M. Munday
Inventor:
Christian C. Hill.
By Munday, Evarts & Adcock
his Attorneys.
N. PETERS, Photo-Lithographer, Washington, D. C.

(No Model.) 6 Sheets—Sheet 2.
C. C. HILL.
MACHINE FOR MAKING SPUR WHEEL FENCING.
No. 373,458. Patented Nov. 22, 1887.
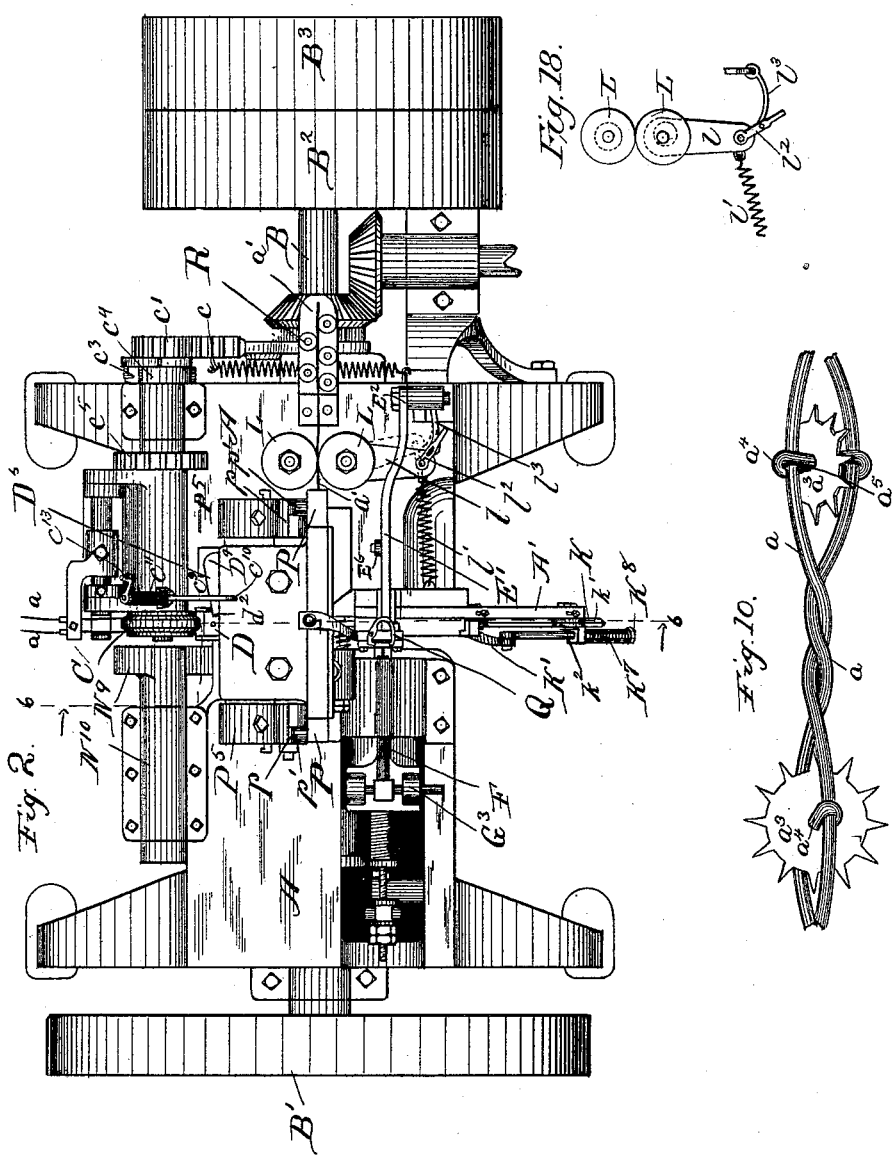

(No Model.) 6 Sheets—Sheet 3.
C. C. HILL.
MACHINE FOR MAKING SPUR WHEEL FENCING.
No. 373,458. Patented Nov. 22, 1887.
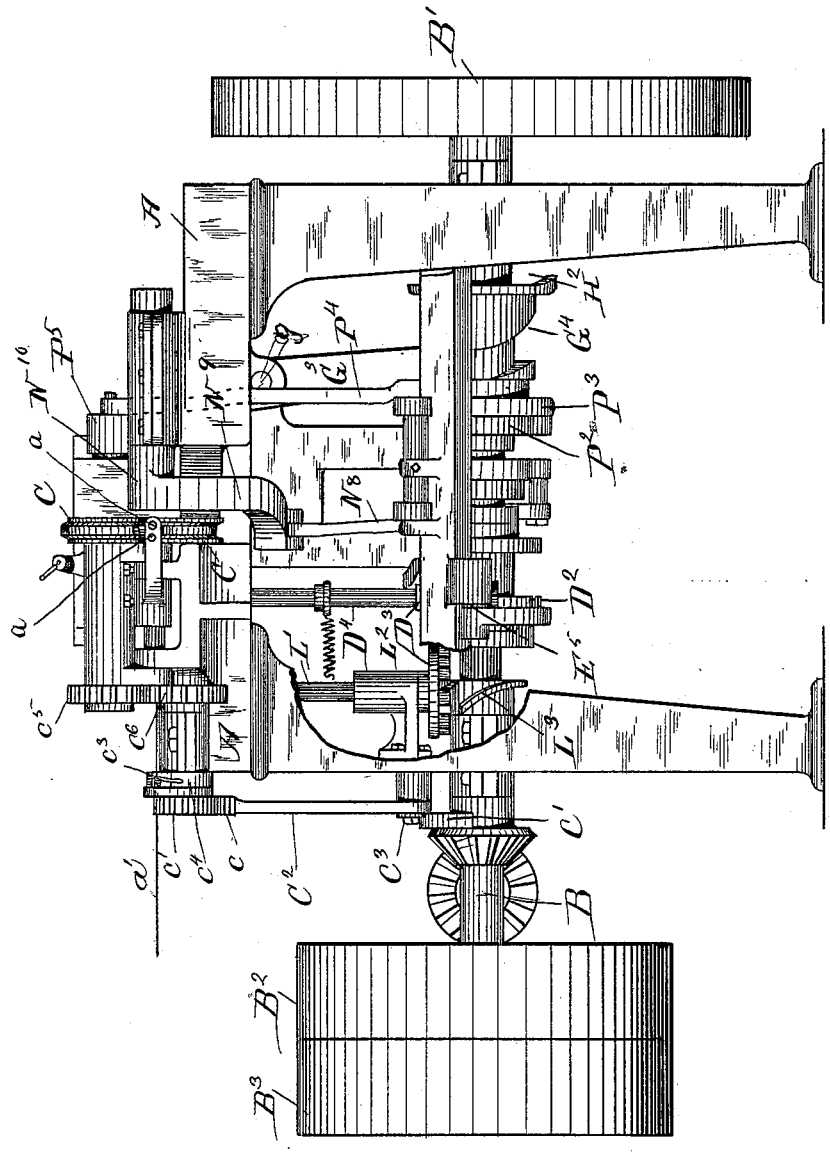

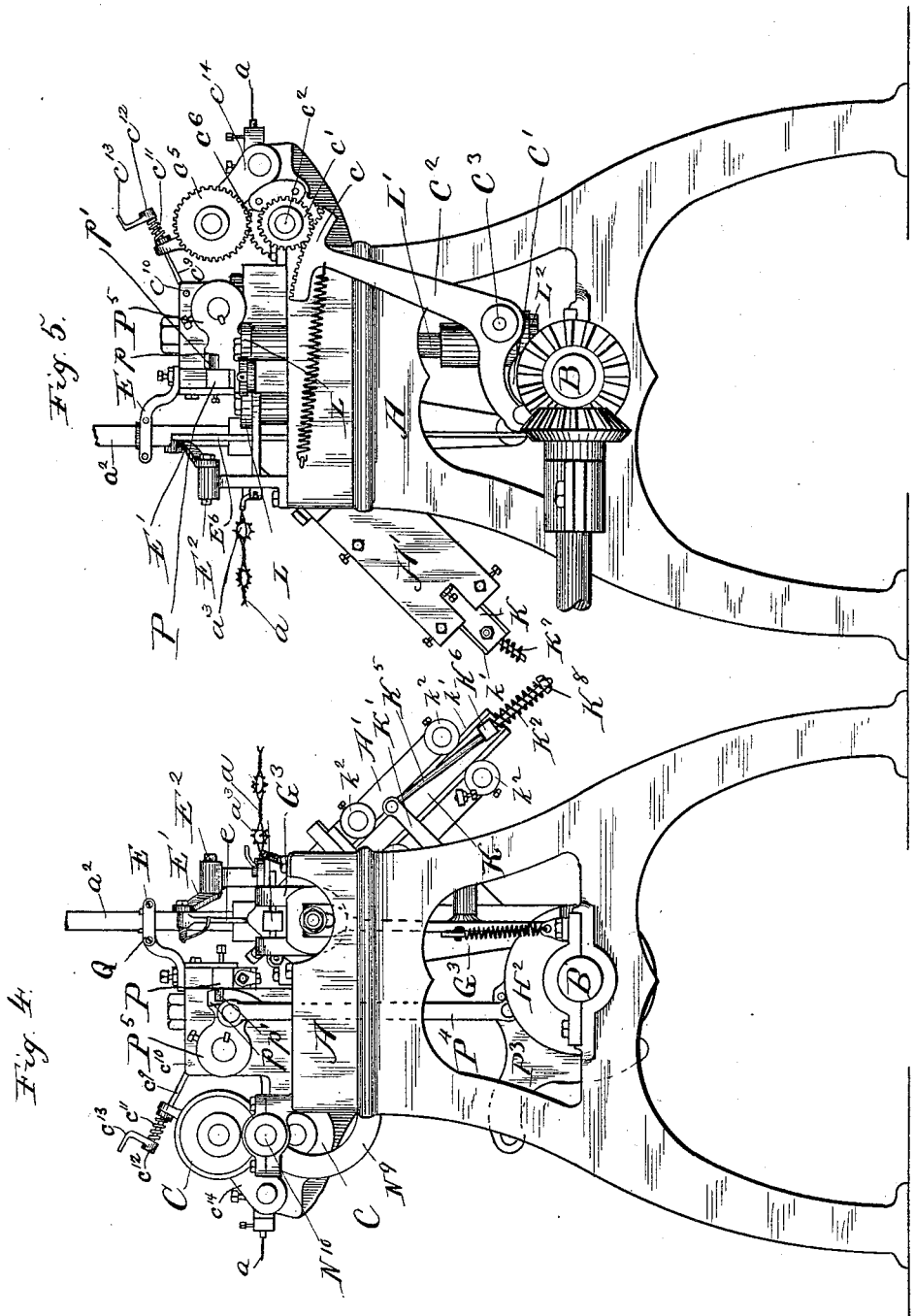

(No Model.) 6 Sheets—Sheet 5.
C. C. HILL.
MACHINE FOR MAKING SPUR WHEEL FENCING.
No. 373,458. Patented Nov. 22, 1887.
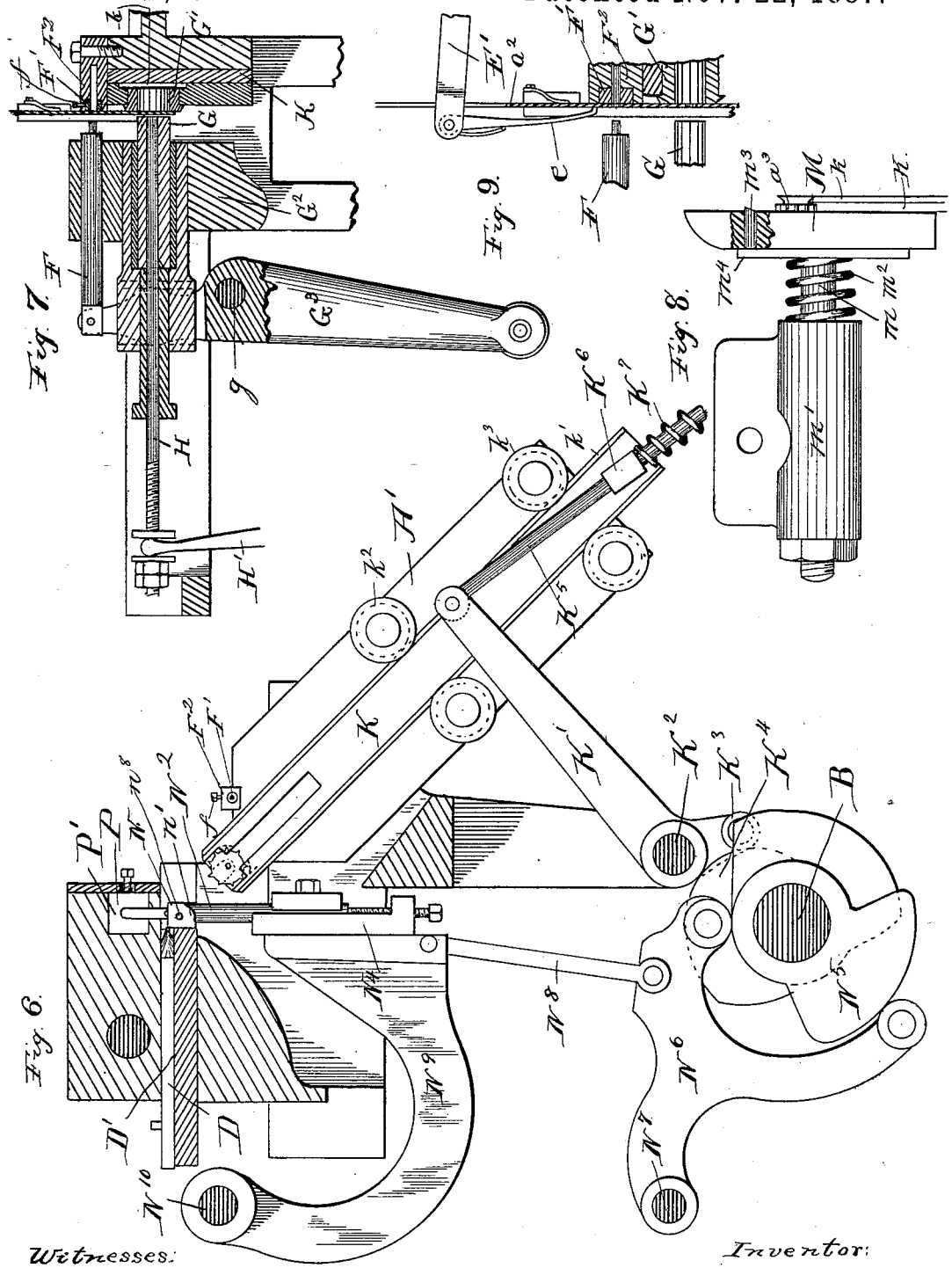
Witnesses:
Lew. E. Curtis.
H. W. Munday
Inventor:
Christian C. Hill
By Munday, Evarts & Adcock
his Attorneys (No Model.) 6 Sheets—Sheet 6.
C. C. HILL.
MACHINE FOR MAKING SPUR WHEEL FENCING.
No. 373,458. Patented Nov. 22, 1887.
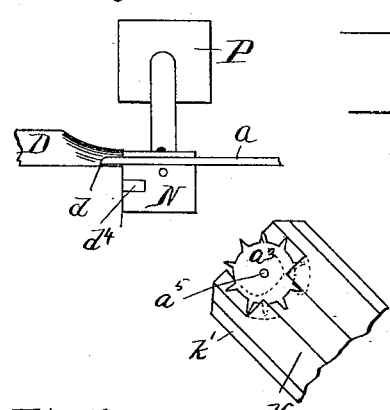
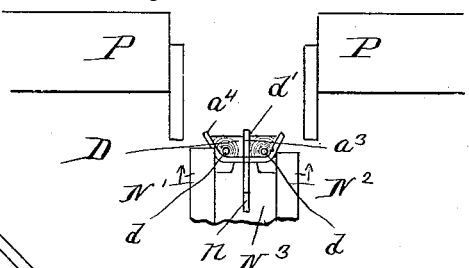
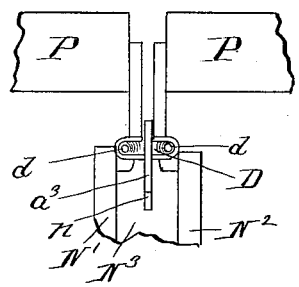
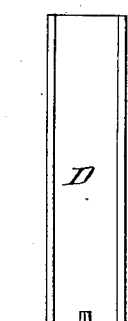
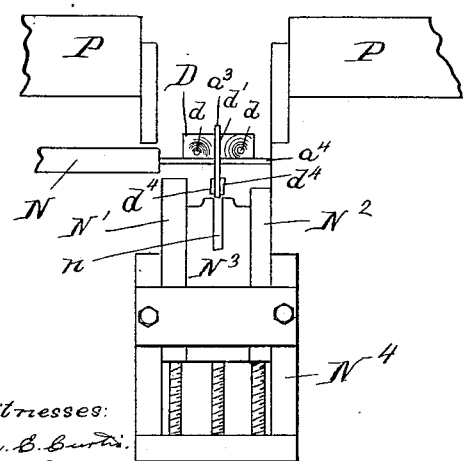

UNITED STATES PATENT OFFICE.

CHRISTIAN C. HILL, OF CHICAGO, ILLINOIS, ASSIGNOR TO THE MONITOR WORKS, OF BELOIT, WISCONSIN.

MACHINE FOR MAKING SPUR-WHEEL FENCING.

SPECIFICATION forming part of Letters Patent No. 373,458, dated November 22, 1887.

Application filed May 3, 1887. Serial No. 236,905. (No model.)

*To all whom it may concern:*

Be it known that I, CHRISTIAN C. HILL, a citizen of the United States, residing in Chicago, in the county of Cook and State of Illinois, have invented a new and useful Improvement in Machines for Making Spur-Wheel Fencing, of which the following is a specification.

My invention relates to machines for making star or spur wheel fencing of the kind shown and described in Letters Patent No. 230,445, of July 27, 1880, to Stoll, and No. 282,453, of July 31, 1883, to Goss; and it relates more particularly to certain improvements upon the spur-wheel-fencing machine heretofore patented to John Willoughby, assignor to the Monitor Works, in Letters Patent No. 343,288, dated June 8, 1886.

The object of my invention is to provide a machine for automatically manufacturing such spur-wheel fencing—that is to say, a machine which will punch or cut the spur wheels or stars from a continuous strip as it is fed through the machine, as well as the central holes in such spur-wheels, cut and insert the pivot through such hole, and apply the pivot and spur wheel to the fence-wires, and thus produce the spur-wheel fencing complete from the raw material as it is bought in the market. In said Willoughby machine above referred to the spur-wheels must be previously punched by another machine. In my invention the spur-wheel or star-strip of suitable width to form the star or spur wheels is intermittingly fed forward into position in front of the punch or die for punching the central hole in the star, and the hole for the star is punched in the strip before the star is cut or punched out. The punch and die for cutting out the star are located farther along in the path of the starstrip and operate to cut out the star at the end of the strip at the same time and by the same movement that the hole is punched in the strip for a succeeding star. The star-stripfeed pawl engages in the hole punched in the strip, by which means I secure a very simple, as well as positive-feed for the star-strip. The star-punch and its operating rod or slide are made hollow, and a rod or pushing device reciprocating therein serves to push the star cut from the strip out of the female die and in front of or into the star-pocket of a reciprocating slide, by which the star is fed into position between the two fence-wires and in front of the cross pivot-wire. This star-feed slide operates in a vertical plane passing between the two fence-wires. The pivot-wire is then pushed forward just under the fence-wires and inserted through the hole in the star. A horizontally-reciprocating slotted pivot-bending nose or horn having guide-holes through which the two fence-wires pass is then moved forward into position for supporting the pivot-wire while the ends of the pivot are bent over or around said slotted horn and the fence-wires, and at the same time a vertically-reciprocating knife moves up and severs the pivot from the pivot-wire, said knife operating in conjunction with an opposing stationary knife. A pair of vertically-reciprocating pivot benders or slides—one on each side of the fence-wires and the horn, and one of which is integral with the movable knife before mentioned—move up (their motion being simply a continuation of the upward movement of said knife) and bend the two ends of the pivot up vertically or at right angles. A pair of horizontally-reciprocating benders or slides then move inward toward each other over the top of the lower or vertically-moving reciprocating benders and bend the ends of the pivot down horizontally together. The slotted nose or horn then withdraws and a clincher, occupying the space between the vertically-moving benders and secured rigidly thereto, moves up and gives the finishing bend to the middle of the pivot. The benders and knives are then withdrawn and simultaneously the two fence-wires and the star-strip are fed forward, and the star-feed slide also at the same time moves a second star into position between the fence-wires.

My invention consists in the novel devices and novel combinations of devices herein shown and described, and more particularly pointed out in the claims.

My invention is not confined or limited to any particular mechanism or mechanisms for giving the several operative devices their respective movements in due order. The means or mechanism for operating the several devices may be greatly varied by the skilled mechanic from that which I have herein shown and described without departing from my invention. Hereinafter in the claims where I have used the term or phrase "mechanism for operating said devices in due order" the same is to be understood as meaning any appropriate or suitable mechanism which may be used for communicating to the several operative devices the movements necessary to enable such devices to perform their described functions, and such words are not to have the effect to in any way limit the scope of the claims to the particular mechanism for operating the several working devices which I have for convenience herein shown and described.

In the accompanying drawings, which form a part of this specification, and in which similar letters of reference indicate like parts, Figure 1 is a side elevation of a machine embodying my invention. Fig. 2 is a plan view; Fig. 3, a rear side elevation; Figs. 4 and 5, end views; Fig. 6, an enlarged vertical sectional view on line 6 6 of Fig. 2. Fig. 7 is a vertical longitudinal section showing the punch for cutting the stars or spur-wheels. Fig. 8 is an enlarged detail view of the yielding guide forming a portion of the star-feed device, and showing, also, the pin or device for extracting the star from the star-feed slide in case the pivot-wire should not be inserted through the star. Fig. 9 is a detailed vertical sectional view showing the device for feeding the star-strip. Fig. 10 is a view of the star or spur wheel fencing as made by the machine, the same being full size; and Figs. 11, 12, 13, 14, 15, and 16 are detailed views illustrating the various steps or operations of the machine in applying the star and pivot to the fence-wire. Fig. 17 is a detail plan view of the guide or slideway in which the horn D reciprocates, and shows, also, the spring-clamps $d^4 d^4$, which guide and hold the spur-wheel while the pivot-wire is being inserted; and Fig. 18 is a detail plan view of the pivot-wire-feed rolls.

In said drawings, A represents the frame of the machine; $a\ a$, the two fence-wires, which are fed parallel to each other through the machine; $a'$, the pivot-wire; $a^2$, the star strip or band of sheet metal from which the stars are punched; $a^3$, the star punched from said strip; $a^4$, the pivot as severed from the pivot-wire, and $a^5$ the hole in the star or spur wheel through which the pivot is inserted.

B is the main driving-shaft of the machine, suitably journaled on the frame, having fly-wheel B' and fast and loose pulleys $B^2 B^3$. This main shaft is furnished with a series of cams by which the various operative parts or devices of the machine are actuated. The fence-wires are intermittingly fed through the machine by a pair of feed-rolls, C C.

The tension of the feed-rolls C C is adjusted so as to properly grip the fence-wires between them by means of an adjusting-screw, $c^9$, attached to the frame at $c^{10}$, and having a spring, $c^{11}$, and threaded nut $c^{12}$, furnished with a handle, $c^{13}$, for turning the same, whereby the upper feed-roll, which is mounted on the pivoted arm $c^{14}$, may be pressed against the lower feed-roll, which is journaled in the stationary frame.

D is a horizontal reciprocating horn or nose, over or around which the pivot-wire is bent, having holes $d\ d$, through which the two fence-wires $a\ a$ pass, and provided with a central vertical slot, $d'$, to receive the spur-wheel or star $a^3$ when it is fed forward into position between the fence-wires and in front of the pivot-wire.

E is a vertical guide through which the star-strip $a^2$ is fed.

F is a horizontally reciprocating punch, and F' the corresponding female die for punching the pivot-holes in the star-strip. The female die F' is secured in a suitable bed-block or frame-piece, $F^2$, by a set-screw, $f$.

G is the punch, and G' the corresponding female die for punching out the stars or spur-wheels from the star-strip.

H is a pusher or rod reciprocating through the hollow punch G for pushing the stars through the female die G' into the pocket $k$ of the reciprocating star-feed slide K. The hole-punch F, as well as the star-punch G, reciprocates back and forth in suitable guides, $G^2$, on the frame of the machine, and the punch F is secured to and operated by the same lever, $G^3$, which operates the punch G. The lever $G^3$ is pivoted to the frame at $g$, and is operated by a cam, $G^4$, on the main shaft B. The pusher-rod H is operated by a lever, H', from the cam $H^2$ on the main shaft B. The star-strip is fed down at intervals by a lever, E', pivoted to the frame at $E^2$, having a pawl, $e$, which engages the hole previously punched in the star-strip by the punch F, the punch F being withdrawn at the time the strip feed takes place. The lever E' is operated from a cam, $E^3$, on the main shaft through a lever, $E^4$, pivoted at $E^5$ to the frame, and a connecting-link, $E^6$, pivoted to said levers E' $E^4$. A spring, $E^7$, serves to move said lever $E^4$ one way. The star-feed slide K has beveled edges $k'$, and reciprocates between or upon friction guide-rollers $k^2$, having peripheral grooves $k^3$ therein, which rollers are journaled upon the frame A or an inclined projecting bar, A', secured rigidly thereto. The slide K is operated by a lever, K', pivoted at $K^2$ to the frame of the machine, carrying a friction-roller, $K^3$, on its short arm, which is operated by a cam, $K^4$, on the cam-shaft B. This lever is connected to the slide K by a pivotal link, $K^5$, which passes through a hole in the head of a pivot, $K^6$, secured to the slide K. A spiral spring, $K^7$, is inserted between this pivot $K^6$ and the nut or head $K^8$ on the end of the link $K^5$, so that in case the feed-slide K should meet with any obstruction the yielding of the spring would prevent injury.

L L are the feed-wheels for the pivot-wire.

The shaft L' of one of these wheels is intermittingly revolved to feed the pivot-wire forward the requisite length for a pivot at intervals by the pin-wheel L² on the end of said shaft, the pins of which engage the spiral cam L³ on the main shaft. The shaft of the other feed-wheel, the left-hand one, as seen in Fig. 5, is journaled in an eccentric bearing in the usual manner. This eccentric bearing has an arm, $l$, to which a spring, $l'$, is attached to press the feed-wheels together and keep the requisite tension upon the wire. Pivoted to this arm $l$ is a lever, $l^2$, connected by a pivoted link, $l^3$, to the frame, whereby the rolls may be relieved from the tension of the spring when it is desired to stop the feed of the pivot-wire. The link is slightly curved, as shown in Fig. 2, so that the lever $l^2$ may be carried past its center, as shown in the dotted lines, and thus be self-locking.

M is a yielding guide bar or plate secured to a horizontal sliding pin, $m$, mounted in the socket $m'$, secured to the frame of the machine and having a spiral spring, $m^2$, which presses said guide-bar M against the star-feed slide K, and thus serves to keep the star in place in the pocket of said slide. The guide-bar M is made yielding to accomodate spurs of different thicknesses, as the sheet-metal strips from which they are cut are not always of a uniform thickness throughout. The guide-bar M is also furnished with a yielding pin or pawl, $m^3$, secured to the plate $m^4$, which surrounds the sliding pin $m$, for the purpose of extracting the star from the feed-slide K when said feed-slide is withdrawn in case a star should fail to be caught by the pivot-wire or for any reason be retained in the feed-slide as it recedes.

N is the stationary knife, having a hole or opening, $n$, through which the pivot-wire passes, and N' the vertically-reciprocating knife by which the pivot is severed from the wire. The upper flat end of the knife N' serves as one of the vertically-moving pivot-benders, and N² is the other corresponding bender-slide.

N³ is the bottom clincher, which serves to support the pivot wire below and also to form the final bend, $a^6$, in the middle of the pivot. This clincher-bar is furnished with a vertical slot, $n$, for the star or spur wheel. The knife and bender-bars N' N² and clincher-bar N³ are all secured rigidly to a reciprocating or oscillating head, N⁴, and are operated simultaneously. These several tools might all be formed in one piece; but it is preferable to make them separate for purposes of independent adjustment, ease of manufacture, and convenience of replacement when worn or broken. The benders N' N² have slight grooves or notches $n'$ for the ends of the pivot-wire. The reciprocating head N⁴ is operated by a cam, N⁵, on the driving-shaft B through a lever, N⁶, pivot N⁷, connecting-link N⁸, and swinging arm N⁹, pivoted at N¹⁰ to the frame, to the head or face of which arm N⁹ the head N⁴ is securely bolted. The cam is of such form as to give the knife, benders, and clincher the required movements, as before described.

P P are the horizontally or inwardly moving benders, which reciprocate in suitable guides, P', over the ends of the benders N' N². These benders are simultaneously operated from the cam P² on the driving-shaft B through a lever, P³, pivotal link P⁴, and rocking cam-head P⁵, having inclined cams or grooves $p$ $p$ in its peripheral face, in which cams $p$ $p$ fit studs $p'$ $p'$, secured to the sliding benders P P. The reciprocating nose or horn D is moved in and out, as required, in its guide or slide way D' by means of a cam, D², on the main shaft, which acts against an arm, D³, on the vertical rock-shaft D⁴, said rock-shaft having an upper arm, D⁵, the outer end of which engages a notch, $d^2$, in the sliding horn D.

The fence-wire-feed wheels C C are intermittingly rotated to feed the fence-wires forward, as required, by a cam, C', on the main shaft, which operates to vibrate a lever, C², pivoted at C³ to the frame, and which is furnished at its upper end with a segment-gear, $c$, that meshes with a gear, $c'$, journaled loosely on the shaft $c^2$ of one of the feed-wheels. To the inner face of this loose gear $c$ is pivoted a pawl, $c^3$, that engages the teeth of a ratchet, $c^4$, secured to the shaft $c^2$ of the feed-wheel C. The upper feed-wheel C, or its shaft, is geared to the shaft of the lower feed-wheel by the spur-gears $c^5$ $c^6$.

Q is an upper guide and tension-clamp for the star-strip.

R R are straightening-rollers for the pivot-wire.

Just below the slotted horn or nose D, I secure a pair of springs or clamps, $d^4$ $d^4$, to the frame of the machine, having outwardly-curved ends to guide the spur or star to place as it is fed or moved into position by the star-feed slide K. These spring-clamps serve, also, to clamp and hold the spur-wheel while the pivot is being inserted through its hole and bent around the fence-wires.

I hereby disclaim as not of my invention the machine shown and described in Patent No. 313,090.

I claim—

1. In a star or spur wheel fencing machine, the combination, with a fence-wire-feed device, a spur-strip-feed device, a punch and die for making the hole in the star, a star punch and die, a star-feed slide, a push-bar for pushing the star into the path of said feed-slide, a pivot-wire-feed device, knives for severing the pivot, a reciprocating horn, a pair of vertically-moving pivot-benders, a pair of horizontally-reciprocating benders, and a clincher between said vertically-moving benders, and mechanism for operating said devices in due order, substantially as specified.

2. The combination, with a spur-wheel feed device, of a pivot-wire-feed device, pivot-wire bending or folding devices, and a horn or nose, and mechanism for operating said devices in due order, substantially as specified.

3. In a spur-wheel-fencing machine, the combination, with suitable guides for the two fence-strands, of a reciprocating spur-wheel-feed slide for moving the spur-wheels into position between the two fence-strands, and a pivot-wire-feed device for thrusting the pivot-wire through the opening in the spur-wheel, and mechanism for operating said devices in due order, substantially as specified.

4. The combination, with a fence-wire-feed device, of a star-feed slide, K, having pockets $k$ for the star, a yielding side guide, M, and a pivot-wire-feed device, and mechanism for operating said devices in due order, substantially as specified.

5. The combination, with a fence-wire-feed device, of a star-feed device, a pair of spring-clamps, $d^4 d^4$, and a pivot-wire-feed device, and mechanism for operating said devices in due order, substantially as specified.

6. The combination, with a fence-wire-feed device, of a star-feed device, a pair of spring-clamps, $d^4 d^4$, a pivot-wire-feed device, and a slotted horn or nose, D, and mechanism for operating said devices in due order, substantially as specified.

7. The combination, with a fence-wire-feed device, of a star-feed device, a pair of spring-clamps, $d^4 d^4$, a pivot-wire-feed device, and a slotted horn or nose, D, having eyes or holes $d\ d$ for the fence-wires, and mechanism for operating said devices in due order, substantially as specified.

8. The combination, with a fence-wire-feed device, of a star-feed device, a pair of spring-clamps, $d^4 d^4$, a pivot-wire feed device, a slotted horn or nose, D, and pivot-wire bending or folding devices, and mechanism for operating said devices in due order, substantially as specified.

9. The combination, with a fence-wire feed device, of a star-feed device, a pair of spring-clamps, $d^4 d^4$, a pivot-wire feed device, a reciprocating slotted horn or nose, D, pivot-wire bending or folding devices, and mechanism for operating said devices in due order, substantially as specified.

10. The combination of a star-strip feed device with punch and die F F', punch and die G G', pusher H, and reciprocating star-feed slide K, and mechanism for operating said devices in due order, substantially as specified.

11. The combination of a star-strip-feed device with punch and die F F', punch and die G G', pusher H, and reciprocating star-feed slide K, having pockets $k$, and mechanism for operating said devices in due order, substantially as specified.

12. The combination of a star-strip-feed device with punch and die F F', punch and die G G', pusher H, and reciprocating star-feed slide K, having pockets $k$, yielding side guide-bar, M, having a pawl or pin, $m^3$, to extract the star on the backward movement of said feed-slide K, and mechanism for operating said devices in due order, substantially as specified.

13. In a star-wheel-fencing machine, the combination, with a pair of parallel guides for the two fence-wires, of a star-wheel-feed slide, K, reciprocating in a plane between the fence-wires, and mechanism for operating said slide, substantially as specified.

14. In a star-wheel-fencing machine, the star-wheel-feed slide K, reciprocating in a plane between the fence-wires and having beveled edges, in combination with friction guide-rollers $k^2$ and mechanism for operating said slide, substantially as specified.

15. In a star-wheel-fencing machine, the combination, with a pair of parallel guides for the two fence-wires, of a star-wheel-feed slide, K, reciprocating in a plane between the fence-wires, an operating-arm, K', having a yielding or spring connection with said feed-slide, and mechanism for operating said slide, substantially as specified.

16. In a star-wheel-fencing machine, the combination of reciprocating star-feed slide K, friction guide-rollers $k^2$, operating-cam $k^4$, lever $k'$, connecting-link $k^5$, pivot $k^6$, and spring $k^7$, substantially as specified.

17. In a star-wheel-fencing machine, the pivot-bender horn D, having eyes $d\ d$ for the fence-wires and slot $d'$ for the star-wheel, the parts of said horn on each side of said slot being rigid or immovable in respect to each other, substantially as specified.

18. In a star-wheel-fencing machine, the pivot-bender horn D, having eyes $d\ d$ for the fence-wires and slot $d'$ for the star-wheel, in combination with mechanism for advancing and withdrawing said horn, substantially as specified.

19. In a star-wheel-fencing machine, the combination of pivot-bender horn D with vertically-moving pivot-benders N' $N^2$, one on each side of said horn, and mechanism for operating said devices in due order, substantially as specified.

20. In a star-wheel-fencing machine, the combination of pivot-bending horn D with vertically-moving pivot-benders N' $N^2$, one on each side of said horn, and longitudinally-moving pivot-benders P P, and mechanism for operating said devices in due order, substantially as specified.

21. In a star-wheel-fencing machine, the combination of pivot-bender horn D with vertically-moving pivot-benders N' $N^2$, one on each side of said horn, and a clincher, $N^3$, between said benders N' $N^2$, and mechanism for operating said devices in due order, substantially as specified.

22. In a star-wheel-fencing machine, the combination of pivot-bending horn D with vertically-moving pivot-benders N' $N^2$, one on each side of said horn, longitudinally-moving pivot-benders P P, and a clincher, $N^3$, and mechanism for operating said devices in due order, substantially as specified.

23. In a star-wheel-fencing machine, the combination of pivot-bender horn D with vertically-moving pivot-benders N' N², one on each side of said horn, and a stationary knife, N, said bender N' having a cutting-edge operating in conjunction with said stationary knife, and mechanism for operating said devices in due order, substantially as specified.

24. In a star-wheel-fencing machine, the combination, with punch and die F F', of punch and die G G' and a star-strip-feed lever, E, having pawl $e$, adapted to engage the holes punched in the star-strip by said punch and die F F', and mechanism for operating said devices in due order, substantially as specified.

25. In a star-wheel-fencing machine, the combination, with punch and die F F', of punch and die G G' and a star-strip-feed lever, E, having pawl $e$, adapted to engage the holes punched in the star-strip by said punch and die F F', and a lever, G³, and cam G⁴ for simultaneously operating both said punches, and mechanism for operating said devices in due order, substantially as specified.

26. In a star-wheel-fencing machine, the combination of benders N N', clincher N³, head N⁴, cam N⁵, lever N⁶, link N⁸, and swinging arm N⁹, to which said head N⁴ is secured, substantially as specified.

27. In a star-wheel-fencing machine, the combination, with horizontally-reciprocating benders P P, of a cam, P², lever P³, link P⁴, rocking cam-head P⁵, having inclined cam-grooves $p\ p$ on its peripheral face, and pins $p'\ p'$, secured to said benders P P, and mechanism for operating said devices in due order, substantially as specified.

CHRISTIAN C. HILL.

Witnesses:
H. M. MUNDAY,
EDMUND ADCOCK.